United States Patent [19]

Deininger et al.

[11] 3,978,245

[45] Aug. 31, 1976

[54] PROCESS FOR THE MANUFACTURE OF A DRY FOODSTUFF POWDER CONTAINING FATS, PROTEINS AND CARBOHYDRATES

[75] Inventors: Rolf Deininger; Erich Wolf, both of Cologne, Germany

[73] Assignee: Klosterfrau Berlin, Berlin, Germany

[22] Filed: July 23, 1974

[21] Appl. No.: 491,497

[30] Foreign Application Priority Data
Oct. 22, 1973 Luxemburg............................ 68658
Apr. 1, 1974 Luxemburg............................ 69764

[52] U.S. Cl................................. 426/585; 426/590; 426/613; 426/656; 426/657; 426/658; 426/471

[51] Int. Cl.²...................... A23J 3/00; A23D 5/00; A23L 2/38

[58] Field of Search ............... 426/43, 98, 163, 164, 426/187, 189, 190, 199, 358, 364, 365, 72, 565, 569, 583, 585, 602, 613, 656, 657, 658, 471, 590

[56] References Cited
UNITED STATES PATENTS
2,619,422 11/1952 Diamond ............................ 426/164
3,090,688 5/1963 Noznick et al............................ 426/43

OTHER PUBLICATIONS
Noznick, P. P., "Powdered Emulsions Tailored to Functions", Food Engineering, June 1965, preprint.

Michaels, A. S., "New Separation Technique for the CPI", Chem. Engr. Prog., Dec. 1968, pp. 31-42.

*Primary Examiner*—Raymond N. Jones
*Assistant Examiner*—R. A. Yoncoskie
*Attorney, Agent, or Firm*—Wenderoth, Lind & Ponack

[57] ABSTRACT

The present invention relates to a process for the manufacture of a dry foodstuff powder containing fats, proteins and carbohydrates characterised in that a fat-free dispersion is formed of protein originating from foodstuff and of water, which dispersion contains carbohydrates and foodstuff supplements such as mineral substances, vitamins and flavoring materials, and in which protein accounts for at least 60% of the solids content and carbohydrates account for at most 35% of the solids content and into which dispersion is emulsified ⅛ to 1 part by weight of edible oil per 1 part by weight of protein, the emulsion then being dried whilst avoiding heating to above 65°C, and the product being converted to a powder. The foodstuff powder obtained by the inventive process, whilst having a relatively high protein content and low carbohydrate content, is pleasant to consume, without causing revulsion.

10 Claims, No Drawings

PROCESS FOR THE MANUFACTURE OF A DRY FOODSTUFF POWDER CONTAINING FATS, PROTEINS AND CARBOHYDRATES

The invention relates to a process for the manufacture of a dry foodstuff powder containing fats, proteins and carbohydrates.

Metabolic disturbances and obesity are frequently due to an excess of carbohydrates and a deficiency of proteins in the nutrition provided. This can be counteracted by providing foodstuffs of minimal carbohydrate content and high protein content without excessive fat content. Experience has shown that if foodstuff granules of such a composition are taken in amounts which suffice to achieve the desired balance in the case of obesity they cause revulsion if only because on chewing an unpleasant sticky mass is formed is formed in the mouth.

It is the object of the invention to design a manufacturing process of the initially mentioned type such that a foodstuff powder obtained, whilst having a relatively high protein content and low carbohydrate content, is pleasant to consume, without causing revulsion.

The process according to the invention is characterised in that a fat-free dispersion is formed from protein originating from foodstuffs and water, which dispersion contains carbohydrates and foodstuff supplements such as mineral substances, vitamins and flavoring materials, and in which protein accounts for at least 60% of the solids content and carbohydrates accounts for at most 35% of the solids content and into which dispersion is emulsified ⅛ to 1 part by weight of edible oil per 1 part by weight of protein, the emulsion then being dried whilst avoiding heating to above 65° C., and the product being converted to a powder.

The process according to the invention produces a foodstuff powder of the desired composition which is easily dispersible in water. To employ the powder, the user can prepare a drink which is pleasant to consume, by adding 15 to 30 grams of the foodstuff powder manufactured according to the process of the invention to 100 milliliters of water, and stirring the mixture with a spoon until a homogeneous mobile dispersion which has a pleasant, creamy flavor has formed. Because of the good dispersibility of the powder manufactured by the process according to the invention, stirring for only a moderately short time is required for this purpose. The flavor of the drink produced in this way can be adjusted individually by means of flavoring materials and the like. The drink produced is pleasantly creamy and acts as a filling foodstuff. About 75 grams of the foodstuff powder manufactured according to the invention can provide the daily requirements of an adult for proteins and fat and if these 75 grams are dispersed in about 2 liters of water, this drink can also provide the dialy requirement for fluids. The increase in a diet of high protein content should, for health reasons, be coupled with a particularly high provision of fluids. Taking the product in the manner described advantageously ensures this. It proves advantageous that the foodstuff powder manufactured in accordance with the process of the invention is particularly readily dispersible in cold water.

The foodstuff powder manufactured by the process according to the invention is also very suitable for the manufacture, or conjoint use in the manufacture of foods such as, for example, soups, cold dishes, pancakes and the like. For soups and the like, a pasty dispersion is used with advantage. Here, a favourable factor is that up to 500 grams of a foodstuff powder manufactured according to the invention can be dispersed in 1 liter of water.

Preferably, milk albumin is employed as the protein, because it is outstandingly suitable for human nutrition. For this purpose, the fat-free dispersion is produced by osmosis-dialysis of skimmed milk and/or whey against water, using a dialysis membrane which is permeable to lactose but is impermeable to milk albumin, and constantly preventing the flocculation of the albumin by adequately maintaining a neutral and sterile medium and avoiding heating to above 65° C. In this way, a fat-free dispersion, which has the desired high protein content in the form of milk albumin which has largely been preserved in its natural molecular structure — meaning the spatial helix structure of the protein macromolecule — can be obtained by simple means on a large industrial scale.

It is also advantageous to use vegetable albumin as the protein, because this is available at low cost. For this purpose, a fat-free dispersion is used which is obtained by suspending parts of plants which contain albumin and have been ground with water, eluting excess carbohydrates and other water-soluble substances from this slurry and dispersing the residue of the slurry by stirring it into water.

In this context, examples of parts of plants, containing albumin, which can be used are soya beans, cereal grains, potatoes and the like, and mixtures thereof.

If a particularly acid-stable dispersion is desired because, for example, acid fruit juices are to be mixed into the dispersion, it is advisable to employ albumin obtained from yoghurt as the protein. For this purpose, a fat-free dispersion is used which is obtained by bacterially acidulating skimmed milk at 38° to 45° C., then centrifuging off the liquid and dispersing the residue in water.

It is also advantageous to employ, as the fat-free dispersion, a mixture of two or three of the abovementioned dispersions.

It has been found that the stability of the dispersion obtained by dispersing the foodstuff powder manufactured according to the invention, especially when using protein obtained from yoghurt, is greatest if the emulsion, before being dried and powdered, is adjusted to pH 6.5 ± 0.5, preferably by addition of dilute sodium hydroxide solution.

The density of the foodstuff powder produced in accordance with the invention depends, inter alia, on the water content of the emulsion, and in particular, the density is the lower, the higher is the water content. An extremely light foodstuff tends to float on water, which impairs the dispersibility, whilst an extremely heavy foodstuff powder tends to settle out in the water, which impairs the stability of the dispersion achieved. This tendency to float up or to settle out, respectively, is avoided by adjusting the water content of the emulsion, prior to drying and powdering, to 50–80% and preferably 60–75%.

A suitable edible oil to use in an oil containing a high proportion of essential fatty acids, for example maize germ oil or thistle seed oil.

The invention is now explained in more detail with the aid of some examples.

EXAMPLE 1

1,400 liters of defatted, germ-free, cow's milk at 60° are dialyzed by dialysis against once distilled water until the sugar content has been reduced to 20 percent by weight, based on solids, and the mineral salt content to 6 percent by weight, based on solids. The following are stirred into the fat-free dialysate thus obtained, which has been concentrated to 300 liters by vacuum evaporation: 37.7 kilograms of maize germ oil with a linoleic acid content of 56%; 48 grams of sodium saccharin; 3 grams of vitamin B1; 3.8 grams of vitamin B2; 5.7 grams of vitamin B6; 13.3 milligrams of B12; 38.2 grams of nicotinic acid amide; 200 grams of vitamin C; 24.4 grams of calcium panthothenate; 2.5 grams of folic acid and ½ kilogram of an oily solution containing 7 grams of vitamin A acetate (1.5 million international units per gram); 3.5 grams of vitamin D3 (0.4 million international units per gram) and 73.5 grams of vitamin E acetate. The mixture is emulsified.

The emulsion obtained, which is neutral and has a water content of 70%, is spray-dried using warm arm, heated to 220° C., in counter-current, the temperatures of the solid or oily substances being kept below 60° C.

The solids residue obtained is a foodstuff powder which can be dispersed in cold and warm water by simple stirring.

The powder has a density of 0.2 gram per cubic centimeter ± 20%. The powder contains the following, by weight: 40% of protein, 40% of fat, and 12% of lactose, the remainder being mineral salts, vitamins and saccharin.

EXAMPLE 2

240 kilograms of flour from wheat grains are suspended in 1,000 liters of water. The carbohydrate content of the slurry is reduced to 10 percent by weight — based on solids — and the mineral salt content is reduced to 5 percent by weight — based on solids — by elution. The slurry is emulsified in an emulsifier and the dispersion obtained is decanted from the non-dispersed solids which settle out. This dispersion is concentrated to 200 liters by vacuum evaporation at 60° C. The following are stirred into the concentrated solution containing albumin: 35 kilograms of thistle seed oil containing 80% of linoleic acid; 50 grams of sodium saccharin; 3 grams of vitamin B1; 3.8 grams of vitamin B2; 5.7 grams of vitamin B6; 13.3 milligrams of B12; 38.2 grams of nicotinic acid amide; 200 grams of vitamin C; 24.4 grams of calcium panthothenate; 2.5 grams of folic acid and ½ kilogram of an oily solution containing 7 grams of vitamin A acetate (1.5 million international units per gram); 3.5 grams of vitamin D3 (0.4 million international units per gram) and 73.5 grams of vitamin E acetate. The mixture is emulsified.

The emulsion obtained, which is neutral and contains 64% of water, is spread on an inert base, frozen at −30° C. and freeze-dried in a vacuum of 0.2 mm Hg. The solids residue obtained is a foodstuff powder which is dispersible by simple stirring in cold and warm water.

The density of the powder is 0.28 gram per cubic centimeter, ± 20%. The powder contains the following, by weight: 46% of protein, 44% of fat, 5.4% of carbohydrates, the remainder being mineral salts, vitamins and saccharin.

EXAMPLE 3

The emulsion is manufactured according to Example 2, with the difference that instead of the 240 kilograms of flour from wheat grains, 150 kilograms of flour from soya beans are employed and that instead of the 50 grams of sodium saccharin 500 grams of sodium cyclamate are employed.

The emulsion obtained, which is neutral, contains 64% of water and is freeze-dried as indicated in Example 2. The dried powder is ground and gives a granular foodstuff powder which is dispersible by simple stirring in cold and warm water.

EXAMPLE 4

30 parts of albumin powder, obtained from skimmed milk, and having a residual water content of 3 to 4%, in which powder the content of pure albumin has been concentrated to 70% by dialysis and which in addition contains 20% of milk sugar (lactose), 6% of mineral salts and 4% of residual moisture, are sub-divided into five batches each of 6 parts by weight. The first batch is left dry and the remaining four batches are worked into a paste with different amounts of water. All five batches are then individually emulsified, each in 4 parts of maize germ oil. The emulsions are spray-dried to a residual moisture content of 1 to 2%. The characteristic properties of the emulsions and of the foodstuff powders produced therefrom are shown in Table 1 below.

TABLE 1

| Part 1 | | | |
|---|---|---|---|
| Batch No. | Water content of the emulsion | pH value of the emulsion | Bulk density of the foodstuff powder[a] |
| 1 | 1 to 2% | pH 7 | 0.244 |
| 2 | 75.5% | pH 7 | 0.216 |
| 3 | 70.6% | pH 7 | 0.208 |
| 4 | 64.3% | pH 7 | 0.224 |
| 5 | 60.7% | pH 7 | 0.248 |

| Part 2 | | |
|---|---|---|
| Batch No. | Dispersibility of the foodstuff powder in tap water at 18 degrees Centigrade[b] | Stability of the dispersion of the foodstuff powder in tap water at 18 degrees Centigrade[c] |
| 1 | poor | not applicable, since not dispersible |
| 2 | good | approx. 60 minutes |
| 3 | good | approx. 45 minutes |
| 4 | good | approx. 30 minutes |

TABLE 1-continued

| | | |
|---|---|---|
| 5 | good | approx. 15 minutes |

"The bulk density is the specific gravity in g/ml (gram per milliliter) of powder heaped as a 10 centimeter layer in a beaker, the powder being densified by repeatedly tapping the bottom of the beaker on a hard surface.
*The dispersibility was assessed as good if 25 grams of the foodstuff powder can be dispersed in 100 milliliters of water by gentle manual stirring with a spoon.
"The times indicated under stability indicate the times during which the dispersed powder had neither settled out nor creamed at the surface, to a visually observable degree.

The table shows that the dispersibility increases with increasing amount of water employed. In the case of batches 3, 4 and 5, the density decreases with the amount of water employed.

EXAMPLE 5

Yoghurt is produced by bacterial acidulation of skimmed milk at 38° to 45° C. and the fluid, and the constituents which have dissolved in the fluid, are withdrawn from the yoghurt by centrifuging. The dry mass which remains contains 70% of protein, 20% of milk sugar (lactose), 6% of mineral salts and 4% of residual moisture. 30 parts of this dry mass are sub-divided into five batches each of 6 parts by weight. The five batches were each individually worked into a paste with an equal amount of water and then adjusted to different pH values by addition of 0.01 N sodium hydroxide solution. The five batches were then each emulsified with 4 parts by weight of maize germ oil. The emulsions are spray-dried to a residual moisture content of 1 to 2%.

The characteristic properties of the emulsions and of the foodstuff powders produced therefrom are shown in Table 2 below.

In the case of batch 10, the foodstuff powder is very light, floats on water and can therefore only be dispersed with difficulty.

EXAMPLE 6

30 parts of albumin powder obtained from skimmed milk powder and having a residual water content of 3 to 4%, of which albumin powder the pure albumin content was concentrated to 70% by dialysis, and which in addition contains 20% of milk sugar (lactose), 6% of mineral salts and 4% of residual moisture, are sub-divided into five batches. Batch 11 contains 10 parts of albumin powder, batch 12 contains 8 parts of albumin powder, batch 13 contains 6 parts of albumin powder, batch 14 contains 4 parts of albumin powder and batch 15 contains 2 parts of albumin powder. Batch 11 contains no maize germ oil. Batch 12 is mixed with 2 parts of maize germ oil and 23 parts of water and emulsified. Batch 13 is mixed with 4 parts of maize germ oil and 23 parts of water and emulsified. Batch 14 is mixed with 6 parts of maize germ oil and 23 parts of water and emulsified. Batch 15 is mixed with 8 parts of maize germ oil and 23 parts of water and emulsified. The 5 emulsion batches are spray-dried to a residual moisture content

TABLE 2

Part 1

| Batch No. | Water content of the emulsion | pH value of the emulsion | Bulk density of the foodstuff powder[a] |
|---|---|---|---|
| 6 | 77% | 4 | 0.392 |
| 7 | 77% | 4.6 | 0.340 |
| 8 | 77% | 5.6 | 0.388 |
| 9 | 77% | 6.1 | 0.240 |
| 10 | 77% | 6.6 | 0.128 |

Part 2

| Batch No. | Dispersibility of the foodstuff powder in tap water at 18 degrees Centigrade[b] | Stability of the dispersion of the foodstuff powder in tap water at 18 degrees Centigrade[c] |
|---|---|---|
| 6 | poor | very poor |
| 7 | good | approx. 10 minutes |
| 8 | good | approx. 10 minutes |
| 9 | good | approx. 30 minutes |
| 10 | poor | approx. 60 minutes |

[a]See footnote to Table 1
[b]See footnote to Table 1
[c]See footnote to Table 1

As shown by the table, the bulk density, the dispersibility and the stability of the dispersion depend on the pH value of the emulsion.

of 1 to 2%.

The characteristic properties of the emulsions and of the foodstuff powders produced therefrom are shown in Table 3 which follows.

TABLE 3

Part 1

| Batch No. | Water content of the emulsion | pH value of the emulsion | Protein content (pure albumin content) of the foodstuff powder |
|---|---|---|---|
| 11 | 70% | pH 7 | 70% |
| 12 | 70% | pH 7 | 56% |
| 13 | 70% | pH 7 | 42% |
| 14 | 70% | pH 7 | 28% |
| 15 | 70% | pH 7 | 14% |

TABLE 3-continued

Part 2

| Batch No. | maize germ oil content of the foodstuff powder | Bulk density of the foodstuff powder[a] | Dispersibility of the foodstuff powder in tap water at 18 degrees[b] | Stability of the dispersion of the foodstuff powder in tap water at 18 degrees[c] |
|---|---|---|---|---|
| 11 | 0% | 0.244 | poor | very poor |
| 12 | 20% | 0.183 | poor | good |
| 13 | 40% | 0.196 | good | very good |
| 14 | 60% | 0.208 | good | very good |
| 15 | 80% | 0.188 | satisfactory | very good |

[a] See footnote to Table 1
[b] See footnote to Table 1
[c] See footnote to Table 1

The foodstuff powders produced in accordance with the examples listed, except for batch 1 from Example 4, batch 6 from Example 5 and batch 11 from Example 6, are converted to a drink by dispersing them to produce a thin fluid, for example using about 100 grams of foodstuff powder per 1 liter of water, whilst to produce soups they are dispersed as a thick fluid using about 400 to 600 grams of foodstuff powder per liter of water.

In all the illustrative embodiments the emulsion, which is subsequently dried, is produced by emulsifying the initial mixture in a emulsifier until the maximum degree of emulsification achievable in this way is reached.

We claim:

1. A process for the manufacture of a dry foodstuff powder having a bulk density of about 0.240 g/ml containing edible oils which are liquid at room temperature, high level of protein and low level of carbohydrates, which consists essentially of:
   a. forming an aqueous, substantially fat-free dispersion containing protein, wherein said protein is selected from the group consisting of:
      i. one obtained by osmosis-dialysis of at least one member selected from the group consisting of skimmed milk and whey, against water, by conducting the dialysis with a dialysis membrane which is permeable to lactose but impermeable to milk albumen and constantly preventing fluocculation of the albumen by adequately maintaining a neutral and sterile medium and maintaining the temperature at 65°C or less;
      ii. one obtained from powdered soya, cereal grain or potatoes;
   or
      iii. one obtained by bacterially acidulating skim milk at 38° to 45°C, then centrifuging off the liquid;
   which dispersion further contains carbohydrates, foodstuff supplements selected from the group consisting of vitamins, minerals and flavoring materials and in which said protein accounts for at least 60% of the non-fat solids content and said carbohydrates account for above 0% but not greater than 35% of the non-fat solids content;
   b. emulsifying the dispersion of step (a) with ⅓ to 1 part edible oil per part protein, said oil containing a high proportion of essential fatty acids;
   c. adjusting the emulsion of step (b) to a water content of 50 to 80% and a pH of about 6.1;
   d. drying the emulsion of step (c) at a temperature not greater than 65°C, thereby forming a powder.

2. A process according to claim 1, wherein two or three different substantially fat-free dispersions selected from the group consisting of (i), (ii) and (iii) are employed.

3. The process according to claim 1, wherein the water content in step(c) is adjusted to 60 to 75%.

4. A process according to claim 1, wherein the essential edible oil is maize germ oil or thistle seed oil.

5. The foodstuff powder produced by the process of claim 1.

6. A foodstuff drink consisting of a dispersion of the foodstuff powder of claim 1 in admixture with water.

7. A process for the manufacture of a dry foodstuff powder containing edible oils which are liquid at room temperature, high level of protein and low level of carbohydrates, which consists essentially of:
   a. forming an aqueous, substantially fat-free dispersion containing protein said protein being obtained by bacterially acidulating skim milk at 38° to 45°C, then centrifuging off the liquid;
   which dispersion further contains carbohydrates and foodstuff supplements selected from the group consisting of vitamins, minerals and flavoring materials and in which said protein accounts for at least 60% of the non-fat solid content and said carbohydrates account for above 0% but not greater than 35% of the non-fat solids content;
   b. emulsifying the dispersion of step (a) with ⅓ to 1 part edible oil per protein, said oil containing a high proportion of essential fatty acids;
   c. adjusting the emulsion of step (b) to a water content of 50 to 80% and a pH of 6.5 ± 0.5
   d. drying the emulsion of step (c) at a temperature not greater than 65°C, thereby forming a powder.

8. A process according to claim 7, wherein the adjustment of pH is made by the use of dilute sodium hydroxide solution.

9. The foodstuff powder produced by the process of claim 7.

10. A foodstuff drink consisting of a dispersion of the foodstuff powder of claim 7 in admixture with water.

* * * * *